US011778667B2

(12) United States Patent
Martinez et al.

(10) Patent No.: US 11,778,667 B2
(45) Date of Patent: Oct. 3, 2023

(54) MITIGATING INTERFERENCE IN CHANNEL ACCESS INVOLVING MULTIPLE SYSTEMS

(71) Applicant: NXP B.V., Eindhoven (NL)

(72) Inventors: Vincent Pierre Martinez, Venerque (FR); Marnix Claudius Vlot, Eindhoven (NL); Alessio Filippi, Eindhoven (NL); Cornelis Marinus Moerman, Waalre (NL)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 17/336,676

(22) Filed: Jun. 2, 2021

(65) Prior Publication Data

US 2021/0385871 A1 Dec. 9, 2021

(30) Foreign Application Priority Data

Jun. 5, 2020 (EP) .................................... 20305599

(51) Int. Cl.
*H04W 4/00* (2018.01)
*H04W 72/12* (2023.01)
*H04W 16/14* (2009.01)
*H04W 74/08* (2009.01)
*H04L 5/00* (2006.01)
(Continued)

(52) U.S. Cl.
CPC ....... *H04W 74/0833* (2013.01); *H04L 5/0053* (2013.01); *H04L 27/2666* (2013.01); *H04W 72/0453* (2013.01)

(58) Field of Classification Search
CPC ........ H01Q 3/36; H01Q 9/0407; H01Q 21/08; H03G 3/3036; H04W 56/01; H04W 4/40; H04W 72/1215
See application file for complete search history.

(56) References Cited

U.S. PATENT DOCUMENTS

| 9,271,241 B2 | 2/2016 | Kenney et al. |
| 9,344,238 B2 | 5/2016 | Vermani et al. |
| 11,147,062 B2 * | 10/2021 | Babaei .............. H04W 74/0808 |

(Continued)

FOREIGN PATENT DOCUMENTS

| EP | 3592087 A1 | 1/2020 | |
| WO | 2020142666 A1 | 7/2020 | |
| WO | WO-2020142666 A1 * | 7/2020 | .............. H04W 4/40 |

OTHER PUBLICATIONS

3GPP TSG RAN WG1 Meeting#81, R1-152939 (Year: 2015).*

(Continued)

*Primary Examiner* — Diane L Lo
*Assistant Examiner* — Abusayeed M Haque

(57) ABSTRACT

In connection with an RF communication system, exemplary aspects involve a method for use in a communication system in which a first system (e.g., 802.11) that is asynchronously based and which is susceptible to interference from a second system (e.g., synchronous-based LTE-CV2X). Such interference is due to the frequency spectrum used by the first and second systems overlapping. To mitigate interference issues, example methods spreads out the times for messages in the first system, based on information concerning occupancy of the channel, and transmitting them relative to the end of a cycled transmission allocated for use by the second system.

19 Claims, 10 Drawing Sheets

(51) Int. Cl.
*H04L 27/26* (2006.01)
*H04W 72/0453* (2023.01)

(56) References Cited

U.S. PATENT DOCUMENTS

| | | | |
|---|---|---|---|
| 2016/0143014 A1 | 5/2016 | Mukherjee et al. | |
| 2016/0173249 A1* | 6/2016 | Kwon | H04L 27/0006 370/329 |
| 2016/0269941 A1* | 9/2016 | Chai | H04W 8/04 |
| 2017/0245304 A1* | 8/2017 | Andreoli-Fang | H04W 74/0816 |
| 2017/0272345 A1* | 9/2017 | Viorel | H04W 74/0816 |
| 2017/0280445 A1* | 9/2017 | Jiang | H04W 72/0446 |
| 2017/0290037 A1* | 10/2017 | Goel | H04W 72/56 |
| 2018/0014146 A1 | 1/2018 | Gulati et al. | |
| 2019/0021094 A1* | 1/2019 | Li | H04W 16/14 |
| 2019/0081753 A1* | 3/2019 | Jung | H04B 7/088 |
| 2019/0182828 A1* | 6/2019 | Garcia-Saavedra | H04W 72/0446 |
| 2020/0162587 A1 | 5/2020 | Martinez et al. | |
| 2022/0317232 A1* | 10/2022 | Manolakos | H04W 72/51 |
| 2022/0377618 A1* | 11/2022 | Liu | H04W 72/0453 |
| 2023/0022666 A1* | 1/2023 | Wu | H04L 5/0048 |

OTHER PUBLICATIONS

3GPP TSG RAN WG2 Meeting#84, R2-133747 (Year: 2013).*
ETSI EN 302663, "Intelligent Transport Systems (ITS); Access Layer Specification for Intelligent Transport Systems Operating in the 5 GHz Frequency Band", V1.2.1, pp. 1-24, Nov. 2012.
ETSI: "Road ITS Coexistence Study", RT(18) 000024a2; ITS(18)000019a2; ERM(18)65b021a2, Retrieved from the Internet: http://www.ieee802.org/11/private/ETSI_documents/ITS/05-CONTRIBUTIONS/2018/ITS(18)00021_BMWi_comments_to_Draft_LS_out_on_ITS_mandate.zip., Aug. 10, 2018.
Johansson, H., "Status ETSI pre-study on co-existence road ITS technologies at 5.9 GHz," ETSI, Dec. 11, 2019.
KAPSCH, ETSI, "ERMTG37(18)000025r1, Co-channel_coexistence_method_for_ITS-G5_and_other_technology", ERMTG37-ITS-G5 LTE V2X coexistence session, Jun. 2018.
Maglogiannis, V., "Innovative Methods for Fair Coexistence between LTE and Wi-Fi in Unlicensed Spectrum." Dissertation to obtain the degree of Doctor of Computer Science Engineering, Universiteit Gent, Dec. 2018.
Ruder, M., "TR 103 766 simulations: performance with and without using TDM (Method A).", Qualcomm CDMA Technologies, ETSI, ERMTG37(20)000043, submitted May 19, 2020.

* cited by examiner

MITIGATING INTERFERENCE IN CHANNEL ACCESS INVOLVING MULTIPLE SYSTEMS

CROSS-REFERENCE TO RELATED APPLICATIONS

This application claims the priority under 35 U.S.C. § 119 of European Patent application no. 20305599.1, filed on 5 Jun. 2020, the contents of which are incorporated by reference herein.

OVERVIEW/BACKGROUND

Aspects of various embodiments are directed to RF frequency co-channel coexistence involving an asynchronous-based system and a second potentially-interfering system which may be synchronous-based in that its transmissions rely on a synchronous network communications protocol.

In various contexts in different regions around the world, different wireless communication systems are being implemented for use of the same frequency spectrum. Unless carefully deployed, such systems may interfere with one another. Non-limiting examples of such spectrum-sharing (or spectrum-competing) systems include technologies using ITS (Intelligent Transport Systems) where spectrum for implementing communications-to-anything transceivers, or "V2X", has been at issue for some time.

These and other matters have presented challenges to efficiencies of frequency spectrum sharing of asynchronous and synchronous communications systems implementations, for a variety of applications.

SUMMARY OF CERTAIN EXAMPLES

Various example embodiments are directed to issues such as those addressed above and/or others which may become apparent from the following disclosure involve spectrum sharing, in particular co-channel coexistence, between two or more technology groups such as any mix of C-V2X-based (e.g., LTE-V2X or 5G NR V2X) technologies and IEEE 802.11-based technologies.

In certain example embodiments, aspects of the present disclosure involve a first asynchronous communications system that is susceptible to interference from a second (synchronous-communications) system. Such a second system, which may refer to one or multiple (e.g., independently-operated) systems, may create interference (e.g., message collisions and/or contention on channel access) with the first system, and the first system modifies its transmissions of its message to overcome or mitigate such interference.

In one example, the present disclosure is directed to a method for communicating over a channel in a first system that is asynchronously based and susceptible to interference from a second system at least partially overlapping with the channel of the first system, the method comprising: based on information concerning duration of occupancy of the channel, spreading out times for messages of the first system to be transmitted relative to an end of a cycled transmission time allocated for use by the second system.

In one or more embodiments, the method may further include assessing or measure whether the channel is too busy relative to a threshold, wherein the information concerning duration of occupancy of the channel includes data based on the step of assessing or measuring whether the channel is too busy, and wherein the second system communicates messages in synchronous time slots according to the cycled transmission time, and wherein the end of a cycled transmission time is aligned at a next start time, or just after the end, of one of the synchronous time slots.

In one or more embodiments, the method may further include assessing or measuring whether the channel is too busy relative to a threshold that corresponds to a synchronous frame allocated for a message to be transmitted via the second system.

In one or more embodiments, the method may further include assessing that the channel is continuously busy relative to a threshold that corresponds to a synchronous subframe of the second system, and in response, increasing a contention parameter to indicate that an increased random or pseudo-random backoff period is to be applied before a station of the first system is to access the channel.

In one or more embodiments, the channel may be common to or fully overlapping via the first and second systems for transmissions of messages, and the first system may be consistent with a CSMA communications protocol and the second system may be consistent with a synchronous-based communications protocol.

In one or more embodiments, the first system may be based on or uses CSMA or 802.11 communications protocols and the second system is based on or uses C-V2X communications protocols, and the first system may include an RF transceiver integrated with a microcontroller or computer circuit for controlling the spreading out of the messages of the first system.

In one or more embodiments, the channel may be common to or fully overlapping via the first and second systems for transmissions of messages, and the first system may be consistent with a CSMA communications protocol and the second system may be consistent with a synchronous-based communications protocol, and may further include assessing that the channel is continuously busy relative to a threshold that corresponds to a synchronous subframe of the second system, and in response, increasing a contention parameter to indicate that an increased contention window is to be used for applying a new pseudo-random backoff period before a station of the first system is to access the channel.

In one or more embodiments, the method may further include causing the messages of the first system to be spread out at times for transmission to avoid the messages of the first system becoming queued or bottlenecked, and/or to mitigate from temporary contention to access the channel at the time the channel becomes available for the first system.

In one or more embodiments, the information concerning duration of occupancy of the channel may be based on detection of the cycled transmission times by a station monitoring and aggregating statistics as a background process while operating in at least one of the receive mode and the transmit mode.

In one or more embodiments, the method may further include a station of the first system detecting the cycled transmission times of the second system by detecting energy other than CSMA/CA traffic.

In one or more embodiments, the method may further include a station of the first system detecting the cycled transmission times of the second system by detecting the presence or absence of no more than a threshold number of CSMA/CA packets received in a period of time corresponding to N cycled transmission time allocations, wherein N is positive integer that is equal to the threshold number.

In one or more embodiments, the method may further include a station of the first system detecting the cycled transmission times of the second system by using synchronized time source to determine the exact start and stop time of a superframe.

In one or more embodiments, the method may further include a station of the first system detecting the cycled transmission times of the second system by extrapolating from one or more previous detections of cycled transmission times to predict a forthcoming start of a C-V2X slot structure based on known repetition properties of the C-V2X slot structure.

In one or more embodiments, the method may further include a station of the first system detecting the cycled transmission times of the second system by using information associated with detected CSMA/CA traffic, in combination with a predicted existence of C-V2X slots, to provide at least part of the information concerning duration of occupancy of the channel.

In one or more embodiments, the information concerning duration of occupancy of the channel may be based at least in part on detection of one of the cycled transmission times of the second system being at least one of: longer than a duration for which medium is expected to contain a transmission; and longer than one millisecond.

In one or more embodiments, the step of spreading out times for messages of the first system to be transmitted may include assigning messages of the first system to be transmitted evenly over time granted or allocated for the first system to transmit to cause a proportioned shifting or delaying of the messages relative to the end of a current one of the cycled transmission times of the second system while preserve a previous order of the messages to be transmitted, and to avoid a backlog of the messages for transmission which would otherwise occur at the finish of the current one of the cycled transmission times of the second system.

In one or more embodiments, the step of spreading out times for messages of the first system to be transmitted may include assigning messages of the first system to be transmitted occurs to effect a delay on messages arriving at circuitry ready to transmit, or associated with controlling transmission, each message of the first system, and the step of spreading out times for messages of the first system to be transmitted may include assigning messages of the first system to be transmitted occurs at one of multiple OSI data processing layers that is higher than a physical layer of the OSI layers, to effect a delay on each message of the first system to be transmitted.

In one or more embodiments, the step of spreading out times for messages of the first system to be transmitted may include holding or delaying assignment times of messages of the first system to be transmitted before passing the assignment times to circuitry associated with controlling transmission of each message of the first system, and then assign the held or delayed messages of the first system so that they are to be transmitted evenly over time granted or allocated for the first system to transmit to cause a proportioned shifting or delaying of the messages relative to the end of a current one of the cycled transmission times of the second system while preserving a previous order of the messages to be transmitted, and to avoid a backlog of the messages for transmission which would otherwise occur at the finish of the current one of the cycled transmission times of the second system.

In another example, the present disclosure is directed to an apparatus (e.g., system, radio, transceiver circuitry or other such related circuitry) for use in communicating over a channel via a first system that is asynchronously based and susceptible to interference from a second system which communicates in spectrum that at least partially overlaps with the channel of the first system. The apparatus includes: processing circuitry to use information concerning duration of occupancy of the channel, and to spread out times for messages of the first system to be transmitted relative to an end of a cycled transmission time allocated for use by the second system.

In more specific examples, such an apparatus may have the processing circuitry configured to cause the spreading out times for messages of the first system to be transmitted includes holding or delaying the start of the CSMA/CA procedure of the first messages of the first system to be transmitted before passing the assignment times to circuitry associated with controlling transmission of each message of the first system. Alternatively and/or in combination, such an apparatus may have the processing circuitry configured to the spreading out times for messages of the first system to be transmitted includes assigning messages of the first system to be transmitted evenly over time granted or allocated for the first system to transmit to cause a proportioned shifting or delaying of the messages relative to the end of a current one of the cycled transmission times of the second system while preserving a previous order of the messages to be transmitted, and to avoid a backlog of the messages for transmission which would otherwise occur at the finish of the current one of the cycled transmission times of the second system.

In yet other specific examples, slot timing discovery and measured message queuing and transmission may be used to enable cooperative frequency channel sharing.

Another example involves a method for use in a communication system in which a first system that is asynchronously based and which is susceptible to interference from a second system. Such interference is due to the frequency spectrum used by the first and second systems at least partially or entirely overlapping such as when interference occurs due to a transceiver of a second (synchronous-based such as C-V2X) system operating on the same channel as an asynchronous-based (e.g., CSMA or 802.11) system. To mitigate such interference issues, in one example the times for messages to be transmitted via the first system are processed so as to be spread out, based on information concerning occupancy of the channel, and then transmitted relative to the end of a cycled transmission allocated for use by the second system. Such an example method may avoid messages of the first system becoming queued or bottlenecked, and/or otherwise mitigate from temporary contention to access the channel at the time the channel becomes available for the first system.

In one or more embodiments, the information concerning duration of occupancy of the channel may be based at least in part on detection of one of the cycled transmission times of the second system being at least one of: longer than a duration for which medium is expected to contain a transmission; and longer than one millisecond, and wherein the processing circuitry is to hold or delay assignment times of messages of the first system to be transmitted before and then assign the held or delayed messages of the first system so that they are to be transmitted evenly over time granted or allocated for the first system to transmit to cause a proportioned shifting or delaying of the messages relative to the end of a current one of the cycled transmission times of the second system while preserving a previous order of the messages to be transmitted The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
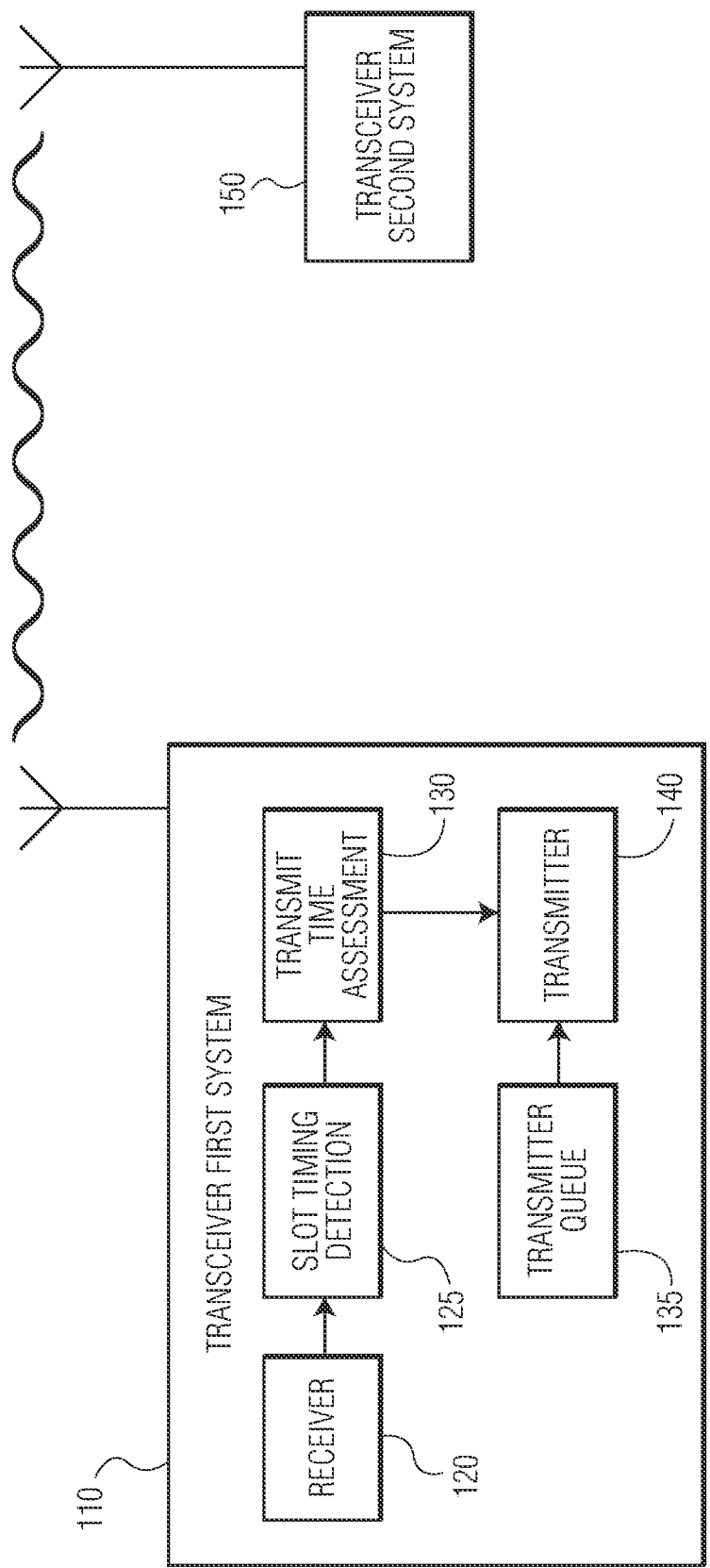
FIG. 1A is a system-level diagram illustrating an example of a first system which may suffer from interference due to a second system, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described.

DETAILED DESCRIPTION

Aspects of the present disclosure are believed to be applicable to a variety of different types of apparatuses, systems and methods involving a plurality of data transmitting systems sharing a frequency channel through a time-sharing method in an effort to mitigate collisions due to interference of the transmission such as when two transceiver stations of respective first and second systems are sufficiently geographically-proximate one another. While the following discussion refers to various protocols (e.g., IEEE 802.11, IEEE 802.11p, IEEE 802.11bd, LTE-V2X sidelink, 5G NR V2X, C-V2X, etc.) for certain communication systems, such discussion is for providing merely an exemplary context to help explain such aspects, and the present disclosure is not necessarily so limited.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In specific examples according to the present disclosure, certain embodiments are directed to a method for use in a communication system in which the first system, such as 802.11 using a CSMA channel access mechanism, that is thus asynchronously based (i.e., communicates messages using an asynchronous network) and which is susceptible to interference from a second system (e.g., synchronous-based C-V2X). Such interference is due to the frequency spectrum used by the first and second systems overlapping. To mitigate interference issues, such an example method spreads out the times for messages in the first system, based on information concerning occupancy of the channel, and transmitting them relative to the end of a cycled transmission time (e.g., next start time or just after the end of the LTE-V2X slot) allocated for use by the second system. In certain more specific examples, the first system may include a radio frequency (RF) transceiver integrated with a microcontroller or computer circuit (e.g., in a vehicular communications system) for controlling the spreading out of the messages of the first system. Such an example method may avoid messages of the first system becoming queued or bottlenecked, and/or otherwise mitigate the first system suffering from temporary high-contention to access the channel at the time the channel becomes available for the first system. The acronym LTE-V2X is one example of a more generic category of technologies which may be referred to as C-V2X which may be, for example, 4G LTE-V2X sidelink mode 3 or mode 4, 4G LTE-V2X Uu, 5G NR-V2X, etc.

In another specific example according to the present disclosure, certain embodiments are directed to a method where the first system assess that a channel is continuously busy, relative to a threshold that corresponds to a synchronous subframe of a second system. In response to discovery of the channel being continuously busy, the first system may increase a contention parameter to indicate that an increased CW (contention window) range may be used for applying a new (pseudo-) random backoff period. The backoff period is used by the first system to delay before it accesses the channel. Assessment of the channel may be based on detection of the cycled transmission times (C-V2X). Detection may be accomplished by a first system station, operating as a receiver, monitoring the channel and aggregating statistics involving the transmission times.

Figure 1B:
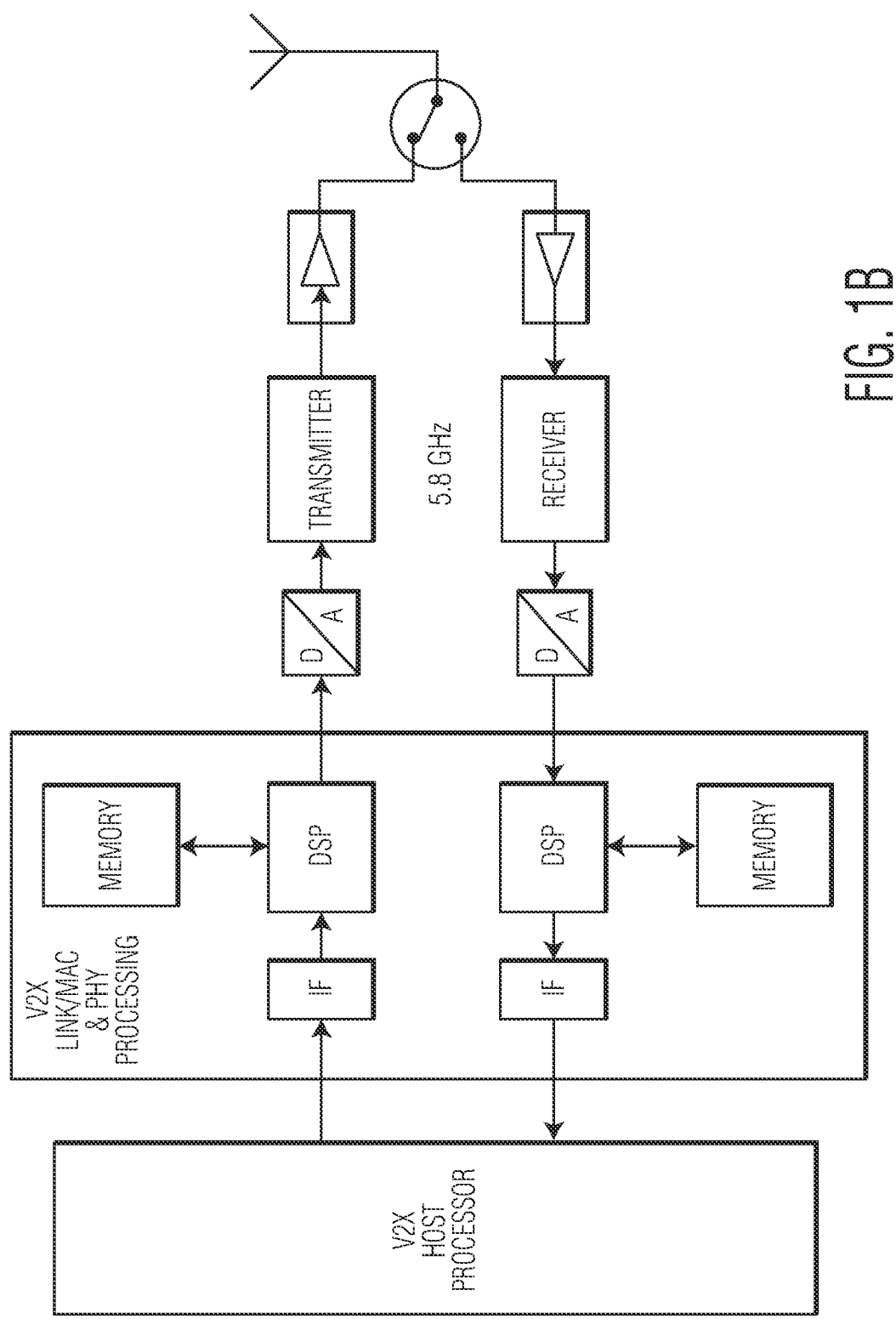
FIG. 1B is a block diagram illustrating an example of a C-V2X transceiver station, in accordance with the present disclosure.

Turning now to the drawings and relating to the above-disclosed aspects and embodiments, FIG. 1A illustrates an example of two transceiver systems operating, at least a portion of time, on the same frequency spectrum channel. In such an example the second system 150 is a synchronously based system (e.g., LTE-CV2X) operating with transmissions occurring in defined time slots. The first system 110 is an asynchronously based system (e.g., 802.11) and may be susceptible to interference when operating in the same channel as the second system such as when two stations respectively associated with the first and second systems are using or attempting to use the same channel (or partially overlapping spectrums used by one of the channels) concurrently or simultaneously. To mitigate the effects of such interference, the first system may spread out messages, in time, using a method of slot timing detection, depicted as block 125, of the second's systems transmissions to detect the end of its timing slot. From such information an assessment may be made by block 130 to determine when the transmit block 140 may send the next message from the transmit queue 135. FIG. 1B illustrates an example of hardware block that may comprise at least a part of a typical LTE-V2X as described in FIG. 1A as the second system.

Figure 2:
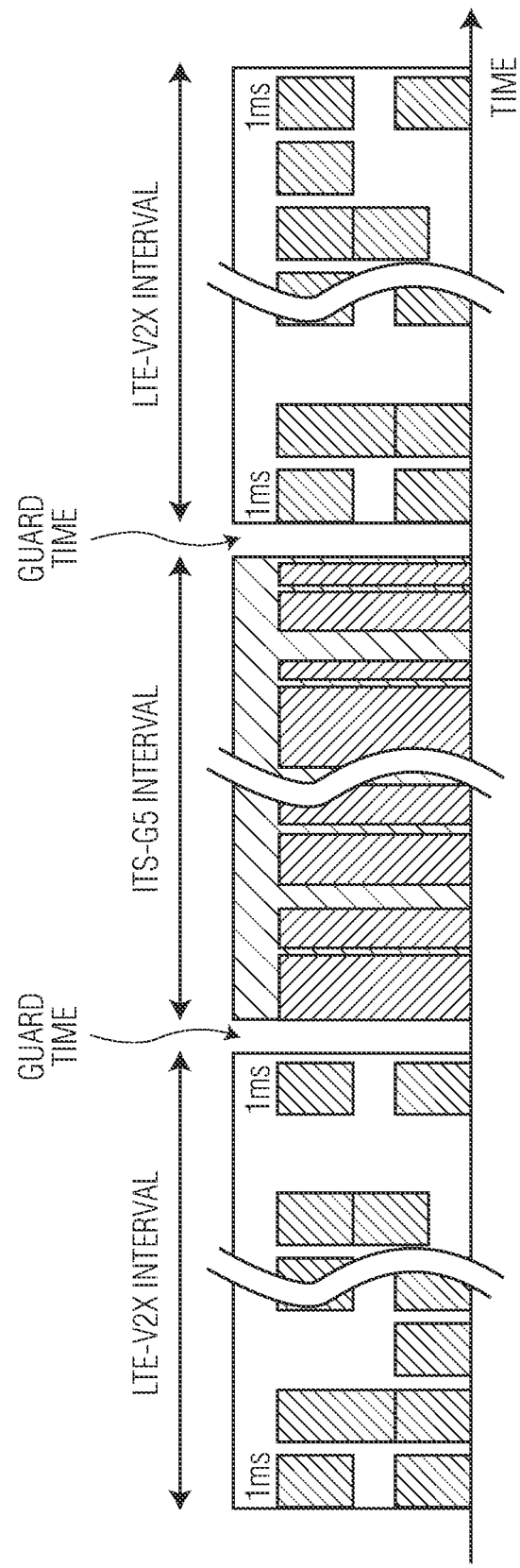
FIG. 2 is a time graph illustrating an example of a C-V2X system sharing a frequency channel with an ITS-G5 system, in accordance with the present disclosure.
Figure 3:
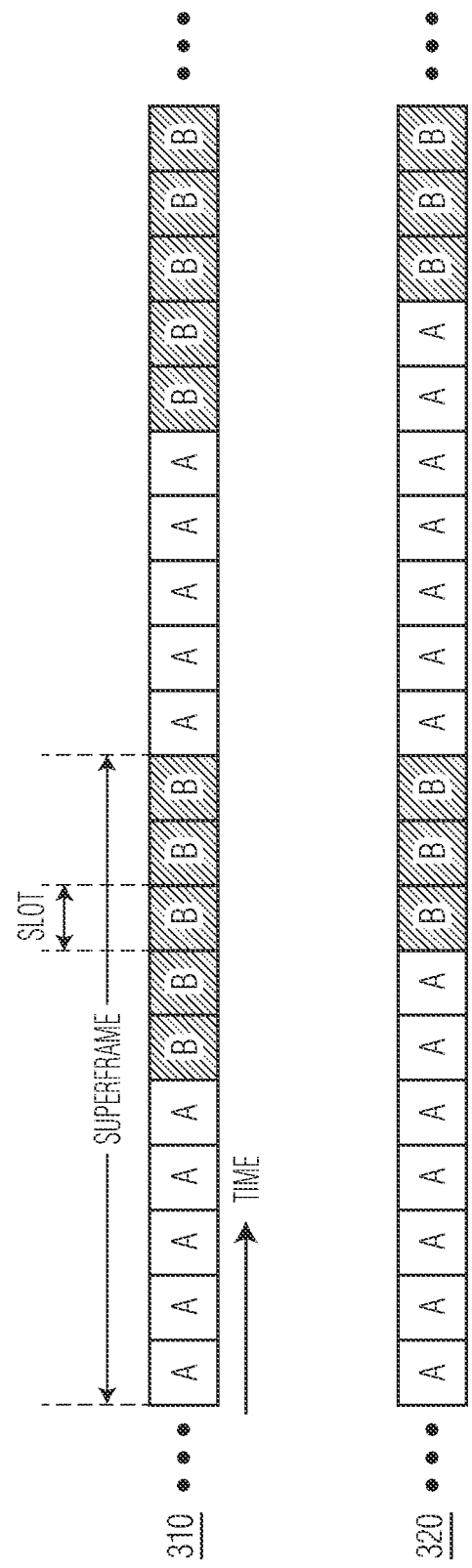
FIG. 3 is a time-graph illustrating an example of a time-sharing method for two technologies, in accordance with the present disclosure.

FIG. 2 is an example of an LTE-V2X system sharing a frequency channel with an ITS-G5 system using TDM (time domain multiplexing). In TDM schemes as envisioned in ETSI TR103766, time may be divided into slots, where one technology may occupy the whole bandwidth for certain period of time. FIG. 2 illustrates such a scenario, where ITS-G5 occupies the whole frequency channel for one time period and LTE-V2X may decide to use parts of the total frequency channel depending on selected modulation, coding scheme, and packet length. Each technology (LTE-V2X or ITS-G5) is granted a number of contiguous time-slots (which may be 1 ms each, matching the duration of an LTE subframe). FIG. 3 illustrates such example, showing two examples of a 10 ms superframe. Row 310 has a 50%-50% organization while row 320 has a 70%-30% organization.

Figure 4:
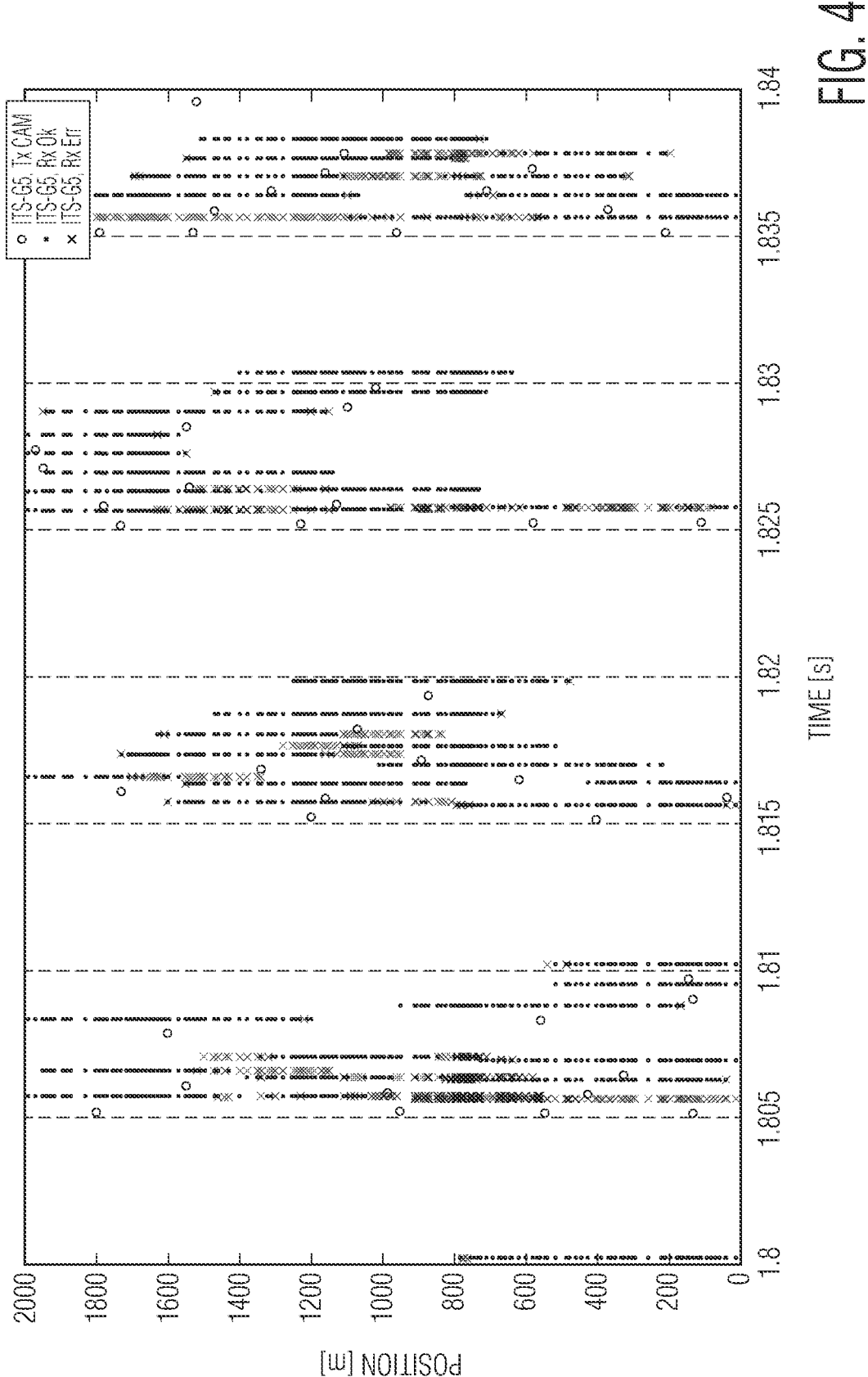
FIG. 4 is time versus position plot illustrating an example of vehicle movement and subsequent packet success, in accordance with the present disclosure.

FIG. 4 is time versus position plot illustrating an example of vehicle movement and subsequent packet success and was created through simulations. The FIG. 4 chart depicts a backlog of ITS-G5 (802.11p based protocol) packets, waiting to be sent, creating substantially more collisions & hidden-node situations right after the (long) LTE-V2X transmission slot ends when ITS-G5 time resumes. This is because a plurality of ITS-G5-equipped vehicles that have a new message generated by upper layers of the ITS stack during the LTE time may sense the medium idle at the same time, perform a backoff and then transmit, at the same time. In the plot in FIG. 4, the x-axis is time and y-axis is the position over the highway. Circles mark the position where a vehicle is when it starts a transmission, then blue points and red x respectively correspond to the position where there may be nodes that correctly receive the packet or that cannot decode it. The boundaries of the slots are marked with dashed lines. It can be noted that there may be more transmissions at the beginning of the slot and most of the reception errors occur at the beginning of a slot. The probability of a packet loss is approximately proportional to the ITS-G5 medium load squared times the duration of the LTE-V2X slot squared. This implies that, due to the long LTE-V2X time, the ITS-G5 messages may not be uniformly distributed over the ITS-G5-granted time, and this becomes a key factor for performance degradation.

Figure 5:
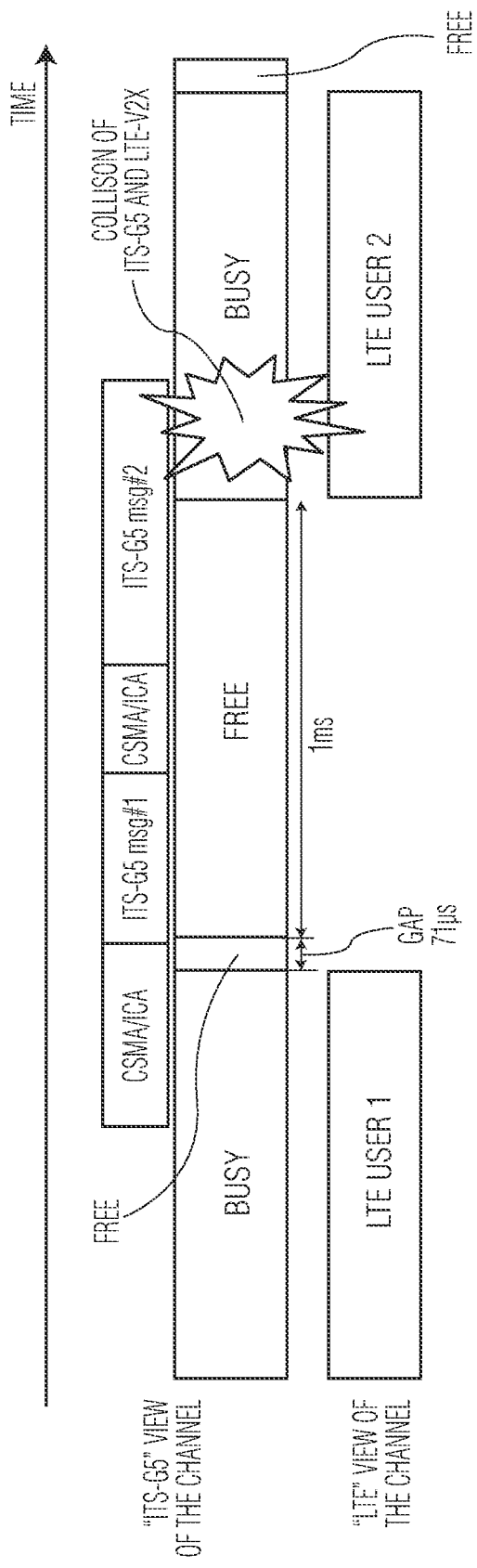
FIG. 5 is a time-graph illustrating an example of ITS-G5 stations transmitting messages in unused C-V2X subframes, in accordance with the present disclosure.

FIG. 5 is a time-graph illustrating an example of ITS-G5 stations transmitting messages in unused LTE-V2X subframes. In the case where the LTE-V2X system decides not to use one or more 1 ms subframes, ITS-G5 messages get access to the channel. A collision may occur if the LTE-V2X system "resumes" transmissions (in the sense the same or another LTE-V2X user may start the next transmission), as shown in FIG. 5 which shows an ITS-G5 time of 1 ms. In the situation of one unutilized subframe, 1.071 ms "free-from-LTE-transmissions" time (71 μsec+1 msec) is available. Thus, any traffic class of ITS-G5 messages can use the channel when it is idle for such a long time.

Figure 6:
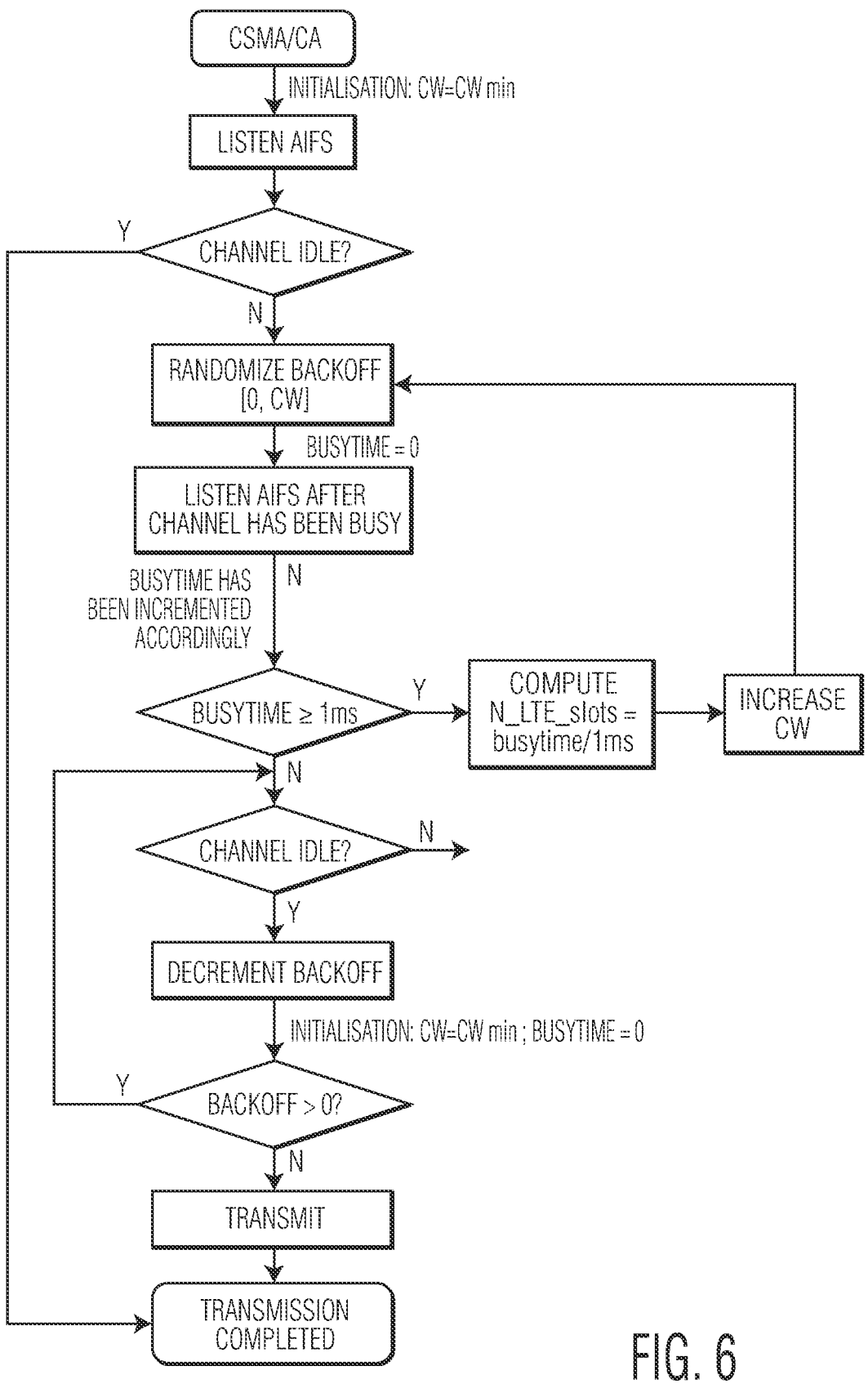
FIG. 6 is a flowchart illustrating an exemplary set of activities and/or data flow for a system to adjust backoff time in CSMA/CA in broadcast mode, in accordance with the present disclosure.

The example flowchart illustrated in FIG. 6 illustrates an example method to adjust backoff time in CSMA/CA in broadcast mode. The standard MAC procedure in ITS-G5 BROADCAST works as follows: First, an integer (backoff value) is drawn from a uniform distribution [0, CW], where CW refers to the current maximum value of the contention window (the total number of integers to draw from is CW+1). Second, the backoff value is decremented by one when the channel was free for a full slot time of 13 μs. If the channel becomes busy during the slot time, then the node has to suspend the countdown until the channel becomes free again. After every busy channel period the node may first wait for the channel to be free for the arbitration inter frame space (AIFS) before the backoff value is further decremented. Third, upon reaching a backoff value of 0, the message is transmitted. In broadcast operation the node may only invoke the first step once during the initial listening period. In broadcast mode the first step of the backoff procedure is only invoked once during the initial listening (AIFS (Arbitration Inter Frame Spacing)) to the channel due to the lack of ACKs in broadcast transmissions. Therefore, CW is always set to its minimum value CWmin and it may never be doubled.

The flowchart of FIG. 6 also illustrates a method where the ITS-G5 stations measure the time during which the channel is continuously busy. This is done by means of a local counter called busytime. When the channel becomes available again, a check is performed on the busytime value as follows: If busytime is greater than a threshold of, for example, 1 ms (that is the duration of 1 LTE subframe), then the estimated number of LTE subframes is computed, CW is increased, a new random backoff is drawn. Whenever the channel becomes available again (channel idle=Y), then the local counter busytime and the CW may be re-initialised to default values. Such a mechanism may ensure that whenever ITS-G5 stations' transmissions may be put on hold due to a series of subframes, such ITS-G5 messages may be spread out over time. It should also be noted that the intention is that, when the channel is busy due to an ITS-G5 message, the CW and busytime counter may not modified. This is possible since the very large majority of the ITS-G5 messages do not last more than 1 ms. The rules for increasing the size of the contention window CW may depend on the ITS application & TDM scheme organization.

Figure 7:
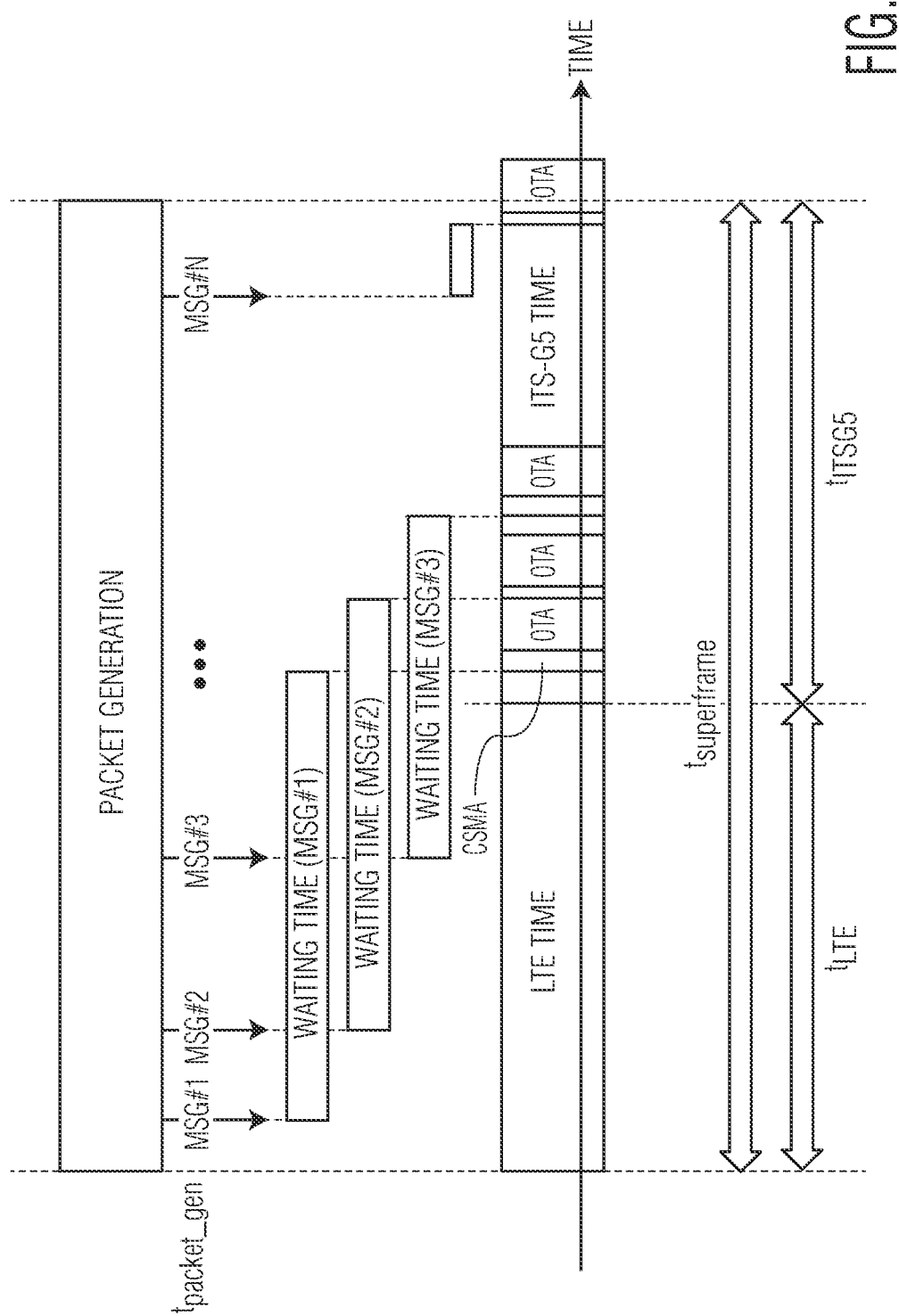
FIG. 7 is a time-graph illustrating an example of an LTE system and an ITSG5 system sharing time using an inserted waiting time, in accordance with the present disclosure.

FIG. 7 is a time-graph illustrating an example of an LTE system and an ITSG5 system sharing time using an inserted waiting time. A waiting period may be added after the packet is generated, to hold before being passed down to the MAC layer. This facilitates or ensures that no new packets arrive with the CSMA MAC function during an LTE time slot but all may be proportionally shifted and/or delayed to the next time slot the CSMA MAC function has effective access to the medium.

In one specific example using such a delay according to the present disclosure, the waiting time is applied proportionally to all packets (e.g., regardless of whether they had been generated by upper layers of the ITS stack during the LTE or ITS-G5 time). In this manner, the order of the start of the CSMA/CA procedure of the ITS-G5 messages may be preserved (after which there may be a bit of randomness in the CSMA/CA procedure). In particular high-contention environments, preserving the order of the start of the CSMA procedure may be advantageous in one or multiple regards including, as examples: there is less randomization of message delays and/or increased fairness of message delays; system behavior is effectively the same as with the original CSMA system at a relative load equal to that of a channel with no second system interfering with the channel; and there is no need to tune or set specific (e.g., empirically-obtained-test) parameters in a modified MAC algorithm to create the desired system behavior.

In another specific example involving such a waiting period, the ITS-G5 packet generation time may not translate directly to the time of start of the CSMA/CA procedure, as a waiting time may be added in between, with the waiting time being a function of the LTE time slot duration and of the superframe duration as exemplified in the following mathematical relationship which is one of various ways to implement such a delay or wait time:

$$t_{wait} = (t_{superframe} - t_{packet\_gen}) \frac{t_{LTE}}{t_{superframe}}$$

Where $t_{wait}$ refers to the waiting time (when the message is being held at upper-layers of the ITS stack before being passed down to the MAC layer), $t_{superframe}$ refers to the time of the overall cycle (the sum of $t_{LTE}+t_{ITS-G5}$), $t_{packet\_gen}$ refers to the time at which the packet was generated by upper-layers, and $t_{LTE}$ refers to the time granted to the LTE-V2X technology within the superframe. For example, with a superframe of 10 ms, and 5 ms ITS-G5 and LTE time slots, with $t_{packet\_gen}$ being equal to one millisecond (ms), this results in the following waiting time:

$$t_{wait}=(10-1)5/10=4.5 \text{ ms}$$

Though this approach may not immediately mitigate the effect of higher collision probabilities due to the overall higher medium load, it does keep (almost) identical behaviour as if the CSMA medium was loaded full time with the same load it experiences during its CSMA slots. An exception is the period just before the LTE slot starts being too short to permit many CSMA packets to be transmitted (as this may cause a collision). Given that this represents only a small fraction of the overall medium time this is acceptable, but alternatively a compensation may be made by subtracting a typical CSMA packet transmission time from the end time of a CSMA slot.

Figure 8:
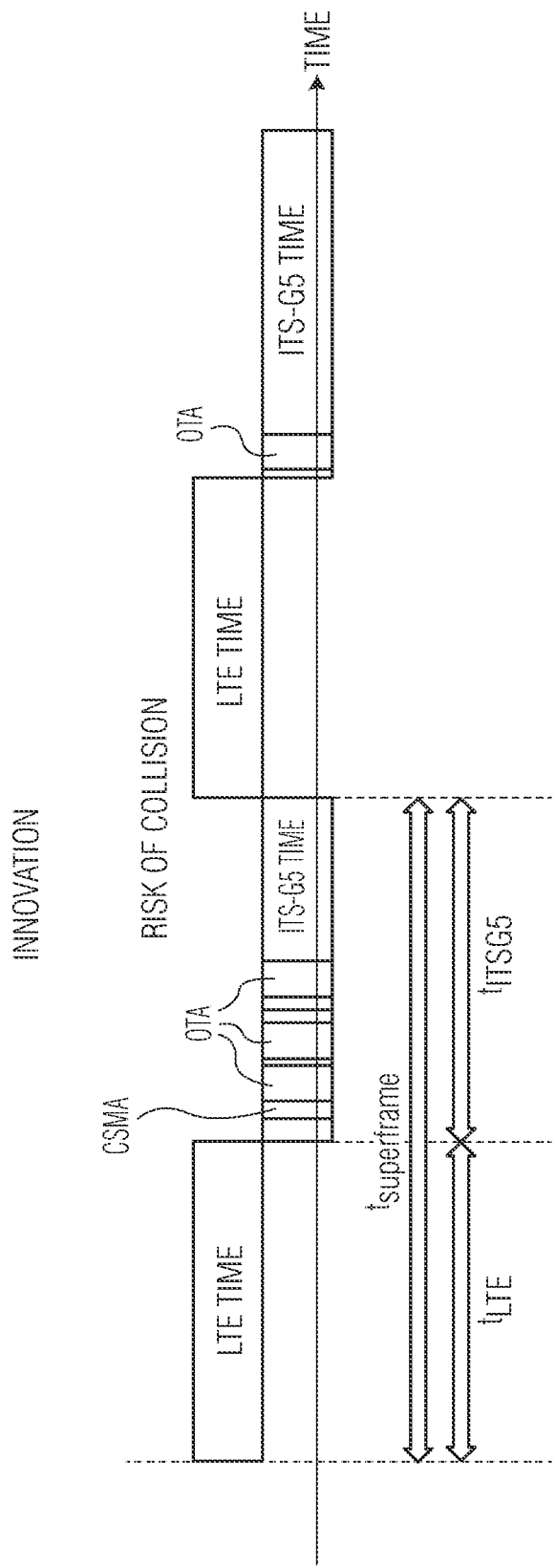
FIG. 8 is a time-graph illustrating an example of ITS-G5 performing a check for busy-in-advance, in accordance with the present disclosure.
Figure 9:
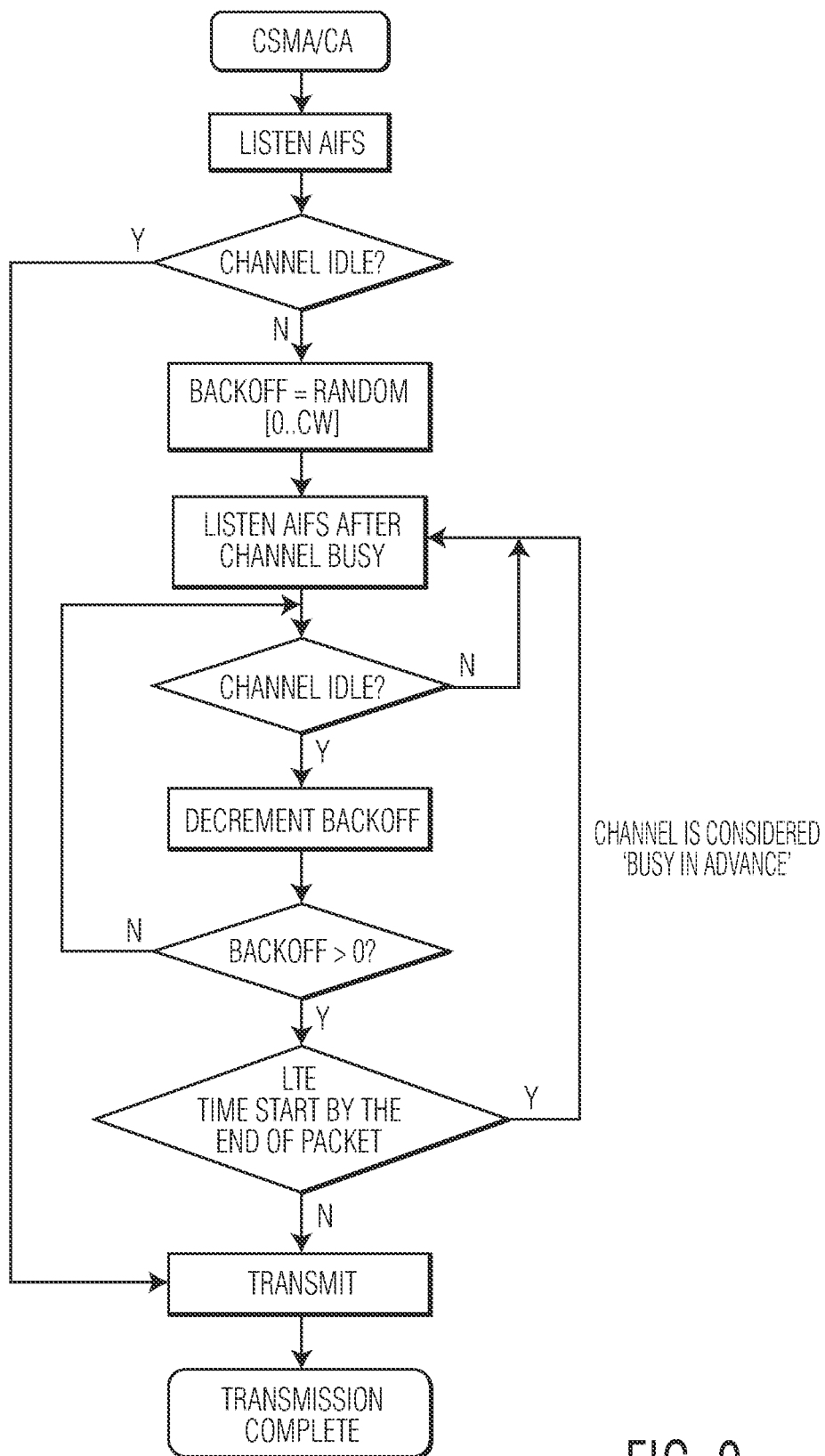
FIG. 9 is a flowchart illustrating an exemplary set of activities and/or data flow for a system of the type implementing a CSMA/CA transmission procedure using a busy-in-advance check, in accordance with the present disclosure.

FIG. 8 is a time-graph illustrating an example of ITS-G5 performing a check for busy-in-advance, which may prevent CSMA/CA channel access just before an LTE-V2X slot. In the FIG. 8 example, the ITS-G5 has knowledge of when LTE time-slot will start, and therefore can check if the selected message may overlap the end of the LTE-V2X slot. When that is the case, the channel is considered 'busy in advance', and the ITS-G5 station may not transmit the packet. FIG. 9 illustrates a flowchart implementing such an example of busy-in-advance.

In certain specific examples, concerning collisions of transmissions, collisions may be mitigated by a method for assessing or measuring whether the channel is too busy relative to a threshold. In such an example the information concerning duration of occupancy of the channel includes data based on the assessing or measuring of whether the channel is too busy.

In a similar example concerning collisions of transmissions, collisions may be mitigated by a method for assessing or measuring whether the channel is too busy relative to a threshold. In such an example the information concerning duration of occupancy of the channel includes data based on the assessing or measuring of whether the channel is too busy, relative to a threshold that corresponds to a synchronous frame allocated, for a message to be transmitted via the second system.

In another embodiment, it may be that the channel is continuously busy relative to a threshold that corresponds to a synchronous subframe of the second system. As a result, a contention parameter (previously identified as CW in FIG. 6) may be increased to indicate that an increased (pseudo-) random backoff period is to be applied before a station, of the first system, may access the channel.

In yet another example, the channel is common to both the first and second systems for transmissions of messages. Also, the first system is consistent with an 802.11 communications protocol and the second system is consistent with a synchronous-based communications protocol (e.g., LTE-CV2X).

In certain specific examples, a first system may detect the cycled transmission times (LTE-V2X slots) of the second system by detecting energy other than CSMA/CA traffic.

In another specific example, further including a station of the first system detecting the cycled transmission times (LTE-V2X slots) of the second system by detecting the presence or absence of no more than a threshold number of CSMA/CA packets received in a period of time corresponding to N cycled transmission time allocations. In this example N is positive integer that is equal to the threshold number.

In another example embodiment, as time may be an important aspect when interoperating asynchronous systems with cycled transmission times (LTE-V2X slots), a method of time synchronization may be required. In such an example embodiment relating to time synchronization, a station of the first system may be used to detect the cycled transmission times of the second system by having a synchronized time source (e.g., GNSS). This may be used to determine the exact start and stop time of a superframe, and/or, extrapolating from one or more previous detection of cycled transmission times, to predict a forthcoming start of an LTE-V2X slot (assuming known repetition properties of the LTE-V2X slot structure).

In another example, aspects of the present disclosure are directed to a station of the first system detecting the cycled transmission times (LTE-V2X slots) of the second system by utilizing information associated with detected CSMA/CA traffic. Utilizing such information in combination with a predicted existence of LTE-V2X slots may provide at least a part of the information concerning duration of occupancy of the channel.

In yet another example, aspects of the present disclosure are directed to information concerning duration of occupancy of the channel. Such information may be based at least in part on detection of one of the cycled transmission times (LTE-V2X slots) of the second system being longer than a target duration (e.g., >1 ms). In such targeted duration time, the medium is expected to contain a transmission. Otherwise the information on channel occupancy may be based, at least in part, on detection of a transmission (non-CSMA) mode that is associated with detected CSMA/CA traffic.

In a specific example relating to the spreading out of messages for transmissions in the shared channel, the step of spreading out times for messages of the first system to be transmitted includes assigning messages of the first system to be transmitted evenly to cause a proportioned shifting or delaying of the messages relative to the end of a current one of the cycled transmission times. This also avoids a backlog of the messages for transmission which would otherwise occur at the finish of the current one of the cycled transmission times of the second system.

Another specific example may involve a step of spreading out times for messages of the first system to be transmitted. Such a step may include assigning messages of the first system to be transmitted at one of the OSI layers that is higher than a physical layer of the OSI layers.

In yet another example, steps of spreading out times for messages of the first system to be transmitted may include holding or delaying assignment times of messages of the first system to be transmitted before passing the assignment times to via a physical layer of the OSI layers, or to the circuit portion of the system that effects or controls timing of the message transmission (e.g., the CSMA algorithm on a message requiring transmission). In so delaying the presentation of the messages to the transmission-ready circuitry, a time warp is effected such that the otherwise queued messages appear to be arriving in spread out intervals relative to the above-noted start time. While in certain example embodiments, this time-warp effort is realized via a proportional distribution, in other examples consistent with the present disclosure, a less then proportional distribution is used.

In another specific example the channel may not entirely overlap in the spectrum with a channel used by the second system.

In connection with an RF communication system, exemplary aspects involve a method for use in a communication system in which a first system (e.g., 802.11) that is asynchronously based and which is susceptible to interference from a second system (e.g., synchronous-based LTE-CV2X). Such interference is due to the frequency spectrum used by the first and second systems overlapping. To mitigate interference issues, example methods spreads out the times for messages in the first system, based on information concerning occupancy of the channel, and transmitting them relative to the end of a cycled transmission allocated for use by the second system.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 12-140 of FIG. 1A depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 6 and 9. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, as shown in FIG. 6. Such modifications do not depart from the true spirit and scope of various aspects of the disclosure, including aspects set forth in the claims.

The invention claimed is:

1. A method for communicating in a broadcast mode over a channel in a first system that is asynchronously based and susceptible to interference from a second system at least partially overlapping with the channel of the first system, the method comprising:
   based on information concerning duration of occupancy of the channel, spreading out times for messages of the first system to be transmitted relative to an end of a cycled transmission time allocated for use by the second system, including:
   assessing whether the channel is busy;
   in response to determining the channel is busy, measuring a time during which the channel is continuously busy using a local counter;
   determining whether the time during which the channel is continuously busy exceeds a threshold; and
   in response to determining that the time during which the channel is continuously busy exceeds the threshold, increasing a contention parameter to indicate that an increased random or pseudo-random backoff period is to be applied before a station of the first system is to access the channel.

2. The method of claim 1, wherein the second system communicates messages in synchronous time slots according to the cycled transmission time, and wherein the end of a cycled transmission time is aligned at a next start time, or just after the end, of one of the synchronous time slots.

3. The method of claim 1, wherein the threshold corresponds to a synchronous frame allocated for a message to be transmitted via the second system.

4. The method of claim 1, wherein the channel is common to or fully overlapping via the first and second systems for transmissions of messages, and wherein the first system is consistent with a CSMA communications protocol and the second system is consistent with a synchronous-based communications protocol.

5. The method of claim 1, wherein the first system is based on or uses CSMA or 802.11 communications protocols and the second system is based on or uses C-V2X communications protocols, and wherein the first system includes an RF transceiver integrated with a microcontroller or computer circuit for controlling the spreading out of the messages of the first system.

6. The method of claim 1, wherein the channel is common to or fully overlapping via the first and second systems for transmissions of messages, and wherein the first system is consistent with a CSMA communications protocol and the second system is consistent with a synchronous-based communications protocol.

7. The method of claim 1, further including causing the messages of the first system to be spread out at times for transmission to avoid the messages of the first system becoming queued or bottlenecked, and/or to mitigate from temporary contention to access the channel at the time the channel becomes available for the first system.

8. The method of claim 1, wherein the information concerning duration of occupancy of the channel is based on detection of the cycled transmission times by a station monitoring and aggregating statistics as a background process while operating in at least one of the receive mode and the transmit mode.

9. The method of claim 1, further including a station of the first system detecting the cycled transmission times of the second system by detecting energy other than CSMA/CA traffic.

10. The method of claim 1, further including a station of the first system detecting the cycled transmission times of the second system by detecting the presence or absence of no more than a threshold number of CSMA/CA packets received in a period of time corresponding to N cycled transmission time allocations, wherein N is positive integer that is equal to the threshold number.

11. The method of claim 1, further including a station of the first system detecting the cycled transmission times of the second system by using synchronized time source to determine the exact start and stop time of a superframe.

12. The method of claim 1, further including a station of the first system detecting the cycled transmission times of the second system by extrapolating from one or more previous detections of cycled transmission times to predict a forthcoming start of a C-V2X slot structure based on known repetition properties of the C-V2X slot structure.

13. The method of claim 1, further including a station of the first system detecting the cycled transmission times of the second system by using information associated with detected CSMA/CA traffic, in combination with a predicted existence of C-V2X slots, to provide at least part of the information concerning duration of occupancy of the channel.

14. An apparatus for use in communicating over a channel via a first system that is asynchronously based and susceptible to interference from a second system which communicates in spectrum that at least partially overlaps with the channel of the first system, the apparatus comprising:

processing circuitry to use information concerning duration of occupancy of the channel, and to spread out times for messages of the first system to be transmitted relative to an end of a cycled transmission time allocated for use by the second system, wherein the processing circuitry is further configured to:
assess whether the channel is busy;
in response to a determination the channel is busy, measure a time during which the channel is continuously busy using a local counter;
determine whether the time during which the channel is continuously busy exceeds a threshold; and
in response to a determination that the time during which the channel is continuously busy exceeds the threshold, increase a contention parameter to indicate that an increased random or pseudo-random backoff period is to be applied before a station of the first system is to access the channel.

15. The apparatus of claim 14, further comprising a station of the first system configured to detect the cycled transmission times of the second system by detecting energy other than CSMA/CA traffic.

16. The apparatus of claim 14, further comprising a station of the first system configured to detect the cycled transmission times of the second system by detecting the presence or absence of no more than a threshold number of CSMA/CA packets received in a period of time corresponding to N cycled transmission time allocations, wherein N is positive integer that is equal to the threshold number.

17. The apparatus of claim 14, further comprising a station of the first system configured to detect the cycled transmission times of the second system by using synchronized time source to determine the exact start and stop time of a superframe.

18. The apparatus of claim 14, further comprising a station of the first system configured to detect the cycled transmission times of the second system by extrapolating from one or more previous detections of cycled transmission times to predict a forthcoming start of a C-V2X slot structure based on known repetition properties of the C-V2X slot structure.

19. The apparatus of claim 14, further comprising a station of the first system configured to detect the cycled transmission times of the second system by using information associated with detected CSMA/CA traffic, in combination with a predicted existence of C-V2X slots, to provide at least part of the information concerning duration of occupancy of the channel.

* * * * *